United States Patent
Lundstrom et al.

[15] 3,666,321
[45] May 30, 1972

[54] HOLDER FOR CUTTING TIP OF MILLING CUTTER MACHINE

[72] Inventors: Hans Per Olof Lundstrom; Bernt Soren Liljekvist, both of Sandviken, Sweden

[73] Assignee: Sandvikens Jernverks Aktiebolag, Sandviken, Sweden

[22] Filed: July 30, 1970

[21] Appl. No.: 59,649

[30] Foreign Application Priority Data

Mar. 24, 1970 Sweden..................................4011/70

[52] U.S. Cl.................................................................299/93
[51] Int. Cl..................................................................E21c 25/44
[58] Field of Search...........................................299/91–93

[56] References Cited

UNITED STATES PATENTS

| | | | |
|---|---|---|---|
| 1,473,498 | 11/1923 | Morgan | 299/93 X |
| 2,811,343 | 10/1957 | Brown | 299/91 |
| 3,429,617 | 2/1969 | Lauber | 299/93 |

FOREIGN PATENTS OR APPLICATIONS

| | | | |
|---|---|---|---|
| 6,611,973 | 4/1967 | Netherlands | 299/92 |

*Primary Examiner*—Ernest R. Purser
*Attorney*—Pierce, Scheffler & Parker

[57] ABSTRACT

A carbide cutting tip is mounted in a separate cartridge which is removably secured in a rotary milling cutter head, so that break-down of the tip will not endanger damage to the cutter head but only the cartridge.

3 Claims, 4 Drawing Figures

HOLDER FOR CUTTING TIP OF MILLING CUTTER MACHINE

The present invention relates to a rock drilling machine of the kind in which the drilling is performed by milling cutter heads which rotate simultaneously around their own axis and around an axis remote therefrom.

In machines of the aforesaid kind difficulties have been encountered in that when the carbide tips used for the drilling break down the tool holder is subjected to contact with the rock material and thereby is damaged.

According to the invention such damage is avoided by mounting the carbide tip in a separate cartridge which cartridge, in turn, is mounted in a rear shank. The advantage of this is that only the cartridge will be damaged should the insert break down.

The invention will now be described with greater particularity and with reference to the accompanying drawing, wherein.

Figure 1:
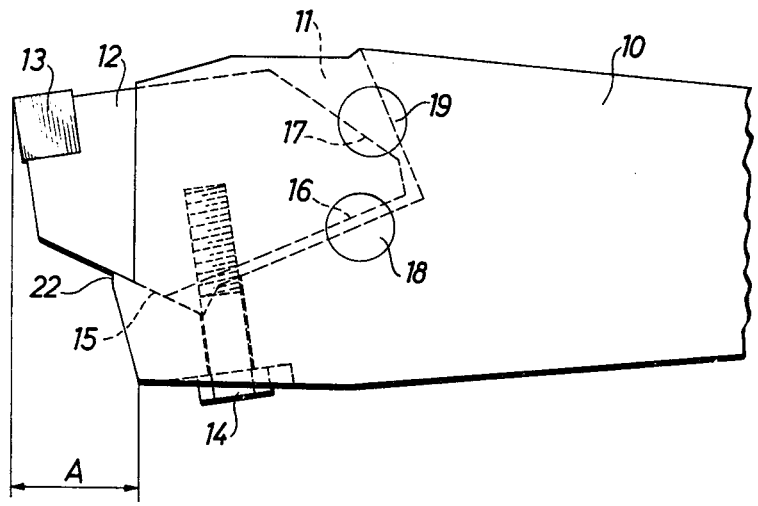
FIGS. 1 and 2 show side and plan views, respectively, of a holder assembly according to the invention.
Figure 2:
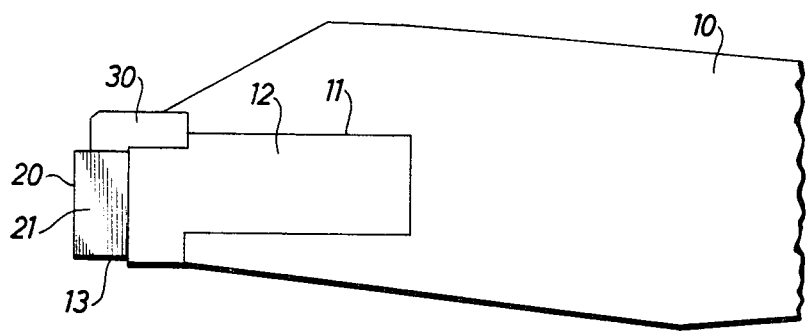

The holder assembly shown in FIGS. 1 and 2 consists of a shank 10 having at its fore end a shaped recess 11 in which is mounted a cartridge 12, carrying a cutting tip 13 of cemented carbide or some other wear-resistant material. In the illustrated case the tip is fastened in the cartridge by brazing but may alternatively be attached by mechanical clamping. The rear part of the shank 10 is fastened in a matching recess in a rotary milling cutter which is not shown in the Figure. For this purpose and as shown in the Figure the shank may have a conical shape.

Cartridge 12 is secured in the shank 10 by means of a screw 14, and is supported at three support surfaces identified at 15, 16 and 17. The support surfaces 16 and 17 are plane recesses on pins 18 and 19 mounted in the shank. The surfaces 15, 16 and 17 are raised from surrounding surface portions of the recess 11 and thereby are easier to keep clean from dirt.

The holder assembly 10, 12 is mounted in the cutter in such a way that the edge 20 acts as a cutting edge and the pressure from the drilled rock is directed towards the surface 21. The cartridge 12 is fixed against the action of this pressure, the fore part resting on the surface 15 and the rear part being wedged between surfaces 16 and 17.

The drilling machine is fed forwards under control in such a way that the tips do not cut out the whole volume of the drill hole but follow a spiral path having a higher pitch than the length of the tips, thus leaving uncut portions between the cut portions. In order to break these uncut portions the tool holder is provided with a shoulder 30 which may be coated with some hard material, for instance a hard weld.

The foremost part of the tip should protrude from the shank 10 at a distance A at least equal to the feed per tooth of the cutter. In this way the most protruding part 22 of the shank is prevented from coming into contact with the rock if the insert should break. Thus the damage caused when the tip breaks and the holder comes in contact with the rock is limited to damage to the cartridge 12.

Figure 3:
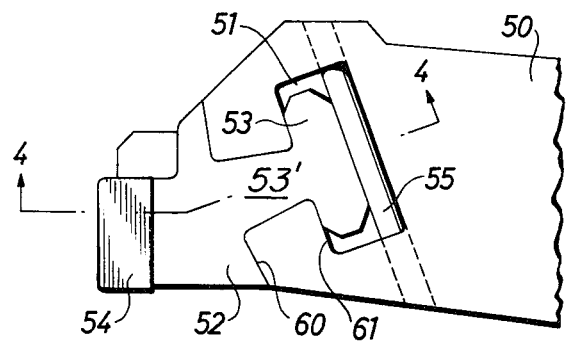
FIG. 3 is a plan view of another embodiment of a holder according to the invention.
Figure 4:
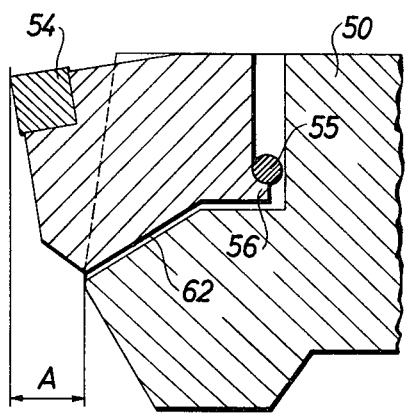
FIG. 4 is a section on the line 4—4 in FIG. 3.

FIGS. 3 and 4 show another embodiment of the holder according to the invention. The shank 50 has a T-shaped slot or recess 51 and the cartridge 52 has a corresponding projection 53 extending to the rear of the cartridge and joined to the main part of the cartridge through a shank portion 53'. When assembled, these parts form a T-slot connection carrying the cartridge in which the tip 54 is secured. A pin 55 is located in the shank above a rear projection 56 on the cartridge and serves to lock the cartridge in the shank.

The surfaces 60 and 61 of shank 50—which oppose surfaces of the cartridge on either side of shank 53'—diverge in a downward direction to establish a suitable wedge form, so that the cartridge is carried solely by its wedging action between 60 and 61, and is spaced from the bottom of the recess 51 by the space 62. The T-slot connection is oriented in the same direction as the rotation of the cutter, so that the connection is pressed together by pressure on the cutting tip.

The surfaces 60 and 61 may, as is illustrated in the drawing, also converge laterally in order to stabilize the cartridge sideways.

In the same sense as in the embodiment illustrated in FIGS. 1 and 2, the cartridge 52 should protrude from the shank a distance A at least equal to the feed per tooth.

We claim:

1. A tool holder assembly for a milling cutter for rock drilling, said assembly comprising a shank adapted to be mounted in the cutter and a holder mounted in said shank, in which the connection between the holder and the shank comprises a T-slot connection converging in the general direction of the mutual contact surfaces, the T-component being wedged in the slot component.

2. A tool holder assembly according to claim 1 in which the tongue and groove connection is directed in such a way that it is tightened by the working pressure on the holder.

3. A tool holder assembly as claimed in claim 1 in which the holder protrudes from the shank a distance not less than the feed per tooth of the cutter.

* * * * *